United States Patent [19]

Minuto

[11] 4,371,493

[45] Feb. 1, 1983

[54] METHOD OF MAKING BOUNCING SILICONE PUTTY-LIKE COMPOSITIONS

[76] Inventor: Maurice A. Minuto, 15 Hemingway Dr., Dixhill, N.Y. 11746

[21] Appl. No.: 183,466

[22] Filed: Sep. 2, 1980

[51] Int. Cl.³ .............................................. B29C 25/00
[52] U.S. Cl. .................................... 264/236; 264/234; 264/344; 264/347; 528/13
[58] Field of Search ................... 528/13; 264/236, 234, 264/344, 347

[56] References Cited

U.S. PATENT DOCUMENTS

| | | | |
|---|---|---|---|
| 2,431,878 | 12/1947 | McGregor | 528/13 |
| 2,541,851 | 2/1951 | Wright | 260/375 B |
| 2,558,561 | 6/1951 | Safford et al. | 528/13 |
| 2,709,161 | 5/1955 | Kibourne | 264/236 |
| 3,070,560 | 12/1962 | Metevia | 528/13 |
| 3,146,799 | 9/1964 | Fekete | 528/13 |

FOREIGN PATENT DOCUMENTS

| | | | |
|---|---|---|---|
| 569530 | 1/1959 | Canada | 528/13 |
| 605218 | 7/1948 | United Kingdom | 528/13 |

*Primary Examiner*—James H. Derrington

[57] ABSTRACT

Silicone putty-like substance is made by mixing dimethyl silicone gum with a boron compound (e.g., boric acid) and a reinforcing filler, and making sheet stocks of the mixture. The sheet stocks are placed on perforated trays in a heating oven and heated at a temperature of about 350° F. to about 500° F. for several hours. The volatiles produced during heating (cooking) of the sheets stocks are removed from the oven by passing air through the perforated trays in order to obtain high bouncing putty which minimal amount of inferior product.

4 Claims, No Drawings

METHOD OF MAKING BOUNCING SILICONE PUTTY-LIKE COMPOSITIONS

FIELD OF THE INVENTION

This invention relates to putty-like silicone compositions popularly known as "bouncing putty" and is particularly related to an improved method of making such putties.

BACKGROUND OF INVENTION

Silicone "bouncing putty" has been widely marketed over the past twenty years. This material, which derives its name from its putty-like consistency and bouncing property, has a unique combination of physical attributes. They are generally plastic and free-flowing under low stress but shatter like glass under a suddenly applied stress. They can be rolled into a ball and bounced, and when bounced, they rebound further and faster than ordinary rubber balls.

A silicone putty exhibiting elasticity or "bounce" is described in U.S. Pat. No. 2,541,581 which issued to James G. E. Wright on Feb. 13, 1951. According to Wright, bouncing putties may be made by heating a mixture of dimethyl silicone and a boron compound, followed by the addition of inorganic fillers and zinc hydroxide and "kneading" the resultant mixture until a putty-like consistency is attained.

In the hitherto known or conventional methods of making silly-putty, a polysiloxane oil, a boron compound and fillers are charged to a so-called "dough mixer" and heated to a temperature of about 350° F. After the mixture attains this temperature, it is "cooked" for several hours and during the cooking operation a nitrogen blanket is spread over the mixture to prevent the volatiles which are produced during this operation from burning or exploding. When the cooking is completed (usually within about 10 hours), the mix is cooled until it can be handled and worked safely and comfortably, and then evacuated from the mixer. Plasticizers are then added and worked into the mix as desired.

When made in conventional mixers by the presently known methods, a high percentage of the putty is rejected because of inadequate or insufficient bounce of the resulting putty. The principal reason for the inferior bounce of the putty made in the presently used conventional mixers, e.g., dough mixers, is that the volatiles produced during heating of the mixture are not expelled from the system. Therefore, and in general, approximately 30 to 50 percent of the bouncing putty produced have inferior or inadequate strength and rebound capability.

Accordingly, it is an object of this invention to make a bouncing putty which has a high degree of rebound, i.e., "bounce" while retaining the other desirable properties and attributes of the putty.

It is also an object of this invention to make bouncing putty by a method which minimizes the amount of the rejected material.

It is a further object of this invention to make such putty-like composition by a method which permits expulsion of the volatiles produced during the process.

SUMMARY OF THE INVENTION

High bouncing, good quality silicone putty-like substance (silly putty) is made by a method which comprises mixing dimethyl silicone gum (polysiloxane gum), a boron compound (e.g., boric acid) and a reinforcing filler into sheet forms. The sheets are placed on perforated trays in a heating oven wherein they are heated (cooked) at a temperature of from about 350° F. to about 500° F., for several hours. The volatiles produced during the reaction of polysiloxane gum and the boron compound are driven-off from the oven by passing air through the perforated trays or by removing the volatiles by other means, e.g., an exhaust means.

After cooking is complete, the sheets are cooled and plasticized with conventional plasticizers for silly putty. The plasticized mass may be compounded with extending fillers, if desired, for cost reduction purposes.

The silly putty made by this method has a very low degree of rejection and exhibits excellent bounce while retaining all other desirable attributes of the putty.

DETAILED DESCRIPTION OF THE INVENTION

It has now been discovered that silicone putty-like substances (silly putty), having high degree of bounce and the requisite strength in addition to other desired attributes can be made by a unique method which permits expulsion or removal of the volatiles produced during the process. Consequently, the degree of rejection of inferior putty, or putty having inadequate rebound capability, is markedly minimized or virtually eliminated.

In accordance with the method of this invention, dimethyl silicone gum, also known as polysiloxane gum, together with a boron compound and a reinforcing filler (both to be hereinafter defined) are first mixed and made into sheet forms. These sheets are next charged to a cooking oven having a plurality of spaced perforated trays and each sheet is spread over one tray. The oven is then heated to a temperature of from about 350° F. to about 500° F. at which temperature the mix (in sheet form) is cooked for several hours. After cooking is completed, the various sheets are removed from the oven, chopped into smaller pieces if desired, and a plasticizer is milled into the mix to achieve the desired degree of plasticization. Extending fillers may be compounded with the resulting putty to reduce its costs.

Although dimethyl silicone polymers (polysiloxane gums) are the preferred silicone polymers for making the high bouncing silly putty in accordance with the method of this invention, other heat vulcanizable silicone polymers may be used in lieu thereof. These heat vulcanizable silicone polymers include vinyl-substituted dimethyl silicones and phenyl-substituted dimethyl silicones.

The dimethyl silicone polymers, the vinyl substituted dimethyl silicones and the phenyl-substituted dimethyl silicones used herein are well known in the art and are described, for example, in the aforementioned Wright patent and in U.S. Pat. No. 3,824,208 issued to Link et al on July 16, 1964, the disclosures of which are fully incorporated herein by reference.

The boron compounds used in the process of this invention are also well known in the art. Although boric acid is preferred, other boron compounds, e.g., pyroboric acid, boric anhydride, ethylborate, and esters of boric acid may be similarly employed.

The reinforcing fillers used herein are of the conventional variety and type as described in the aforementioned patent of Link et al, the disclosure of which is again fully incorporated herein by reference. Such reinforcing fillers include fumed silica and silica aerogels.

The relative amounts of the various ingredients may vary somewhat without detrimental effects on the bouncing property of the putty. Thus, for each 100 parts by weight of polysiloxane gum, from about 5 to about 20 parts of reinforcing fillers and from about 5 to about 20 parts of boron compound and 5 to 15 parts of reinforcing filler.

As it was previously mentioned, the aforementioned ingredients are first mixed and made into several homogeneous sheet stocks, which is each preferably about ⅛ inch thick, although the thickness of these sheets is not per se critical and may vary from about ¼ inch to about 1 inch or even more. Each sheet is placed on a perforated tray in a cooking oven or reactor which may contain a plurality of such trays, and the oven is heated until the desired cooking temperature is reached, usually about 350° F. to about 500° F. Typically, the cooking temperature is about 450° F.

The mixture (in sheet forms on each tray in the oven) is cooked for several hours depending on the thickness of the sheets as well as the cooking temperature. Typically 2 to 6 hours of cooking is sufficient to complete the reaction and obtain the desired product. During the cooking operation considerable volatile materials are produced as by-products of the reaction between the polysiloxane gum and the boron compound. These volatiles must be expelled from the system to insure that the resulting putty will have high degree of bounce and in order to minimize the production of inferior quality putty. In the method contemplated herein, the volatiles are permitted to pass through the perforations in the trays and to escape from the oven. Alternatively, the volatiles may be removed from the oven as they are produced using conventional means such as forced draft or any other similar technique.

After cooking is complete, the sheet stocks are cooled to ambient temperature, or slightly higher but manageable temperature, and a suitable plasticizer is added and worked into these sheets, e.g., by high speed mixing or milling. The plasticizers used herein are also of the type heretofore used in making silly putty as described in the aforementioned patents, the most common plasticizer being oleic acid. Generally, from about 0.5 to about 2 parts by weight of plasticizer per 100 parts of the silicone polymer is suitable for most formulations.

If desired, the resulting mass may be compounded with extending fillers, e.g., celite (calcined diatomaceous silica), Min-U-Sil (ground quartz), titanium oxide or zinc oxide in order to reduce the cost of putty.

The following example will serve to further illustrate the method of this invention in which all parts are by weight.

EXAMPLE 100 parts polysiloxane gum, 10 parts boric acid and 10 parts Cabosil MS-7 (a reinforcing filler sold by Cabot Corporation) were blended in a high speed mixer and made into sheet stocks approximately ⅛ inch thick using a conventional type rubber mill. The sheets were placed on perforated aluminum trays in a cooking oven and heated to 450° F. After attaining this temperature (in approximately 1 hour), these sheet stocks were cooked for 2 hours while the volatiles produced during the cooking operations were removed from the oven by air flowing through the oven and the perforated trays and out into an exhaust.

The resulting sheets of putty were then cooled to ambient temperature for approximately 3 days and then plasticized with oleic acid.

All the silly putty made in this example had a rebound of over 70 percent and had exceptionally good stretch.

While the invention was heretofore described with a certain degree of particularity, it is to be understood that some modifications and changes may be made therein which are obvious, from this disclosure and are therefore within the contemplation and scope of this invention.

What is claimed:
1. A method of making bouncing silicone putty-like substance which comprises:
    (a) mixing a vulcanizable silicone polymer with a boron compound and a reinforcing filler and making a sheet stock of the resulting mixture,
    (b) placing said sheet stock in an oven containing at least one perforated tray and cooking the sheet stock at a temperature of from about 350° F. to about 500° F. for several hours,
    (c) removing the volatiles produced during the cooking operation described in step (b) from said oven by passing air through said perforated tray, and
    (d) cooling the sheet stock.
2. A method as in claim 1 wherein said vulcanizable silicone polymer is dimethyl silicone and said boron compound is boric acid.
3. A method as in claim 1 wherein the amount of said boron compound is from about 5 parts to 20 parts per 100 parts by weight of the silicone polymer and the amount of the reinforcing filler is from about 5 parts to 100 parts by weight of the silicone polymer.
4. A method as in claim 2 wherein the amount of said boric acid is from about 5 parts to about 20 parts per 100 parts by weight of the dimethyl silicone polymer.

* * * * *